United States Patent [19]

Schneider et al.

[11] 4,126,399
[45] Nov. 21, 1978

[54] METHOD AND APPARATUS FOR PREPARING MULTI-COMPONENT PLASTIC MATERIALS, PARTICULARLY POLYURETHANE, WITH SOLID MATERIAL ADDITIVES OR AT LEAST ONE HIGHLY VISCOUS COMPONENT

[75] Inventors: Fritz W. Schneider, Strasslach-Hailafing; Ivica Grgic, Munich, both of Germany

[73] Assignee: Elastogran Maschinenbau GmbH & Co., Munich, Germany

[21] Appl. No.: 814,348

[22] Filed: Jul. 11, 1977

[30] Foreign Application Priority Data

Jul. 14, 1976 [DE] Fed. Rep. of Germany ....... 2631588

[51] Int. Cl.$^2$ ............................................. B01F 15/00
[52] U.S. Cl. ................................... 366/159; 366/131; 366/160; 366/161; 366/267
[58] Field of Search ............... 366/131, 159, 160, 161, 366/162, 267

[56] References Cited

U.S. PATENT DOCUMENTS

| 2,847,196 | 8/1958 | Franklin | 366/161 |
| 2,903,248 | 9/1959 | Walker | 366/161 |
| 3,051,455 | 8/1962 | Magester | 366/159 X |
| 3,067,987 | 12/1962 | Ballou | 366/161 |

*Primary Examiner*—Edward J. McCarthy
*Attorney, Agent, or Firm*—H. Dale Palmatier

[57] ABSTRACT

Method and apparatus for preparing multi-component plastic materials wherein at least one of the components is compounded with admixed solid materials or is highly viscous, the various components are continuously recycled and are metered separately by associated continuously operating feed pumps, and a mixing operation is effected in a mixing chamber served by a control piston. In the circuit for the compounded or viscous component a transmitter device is connected in a position downstream of the respective continuously operating feed pump and upstream of the associated mixing chamber inlet port. This transmitter device operates in a manner similar to a piston pump and increases the delivery pressure of the compounded or viscous component upon discharge into the mixing chamber whereby the operation of the transmitter is operatively coupled to the operation of the control piston at the mixing chamber. The component circuit may furthermore include a filling pump and a check valve.

6 Claims, 2 Drawing Figures

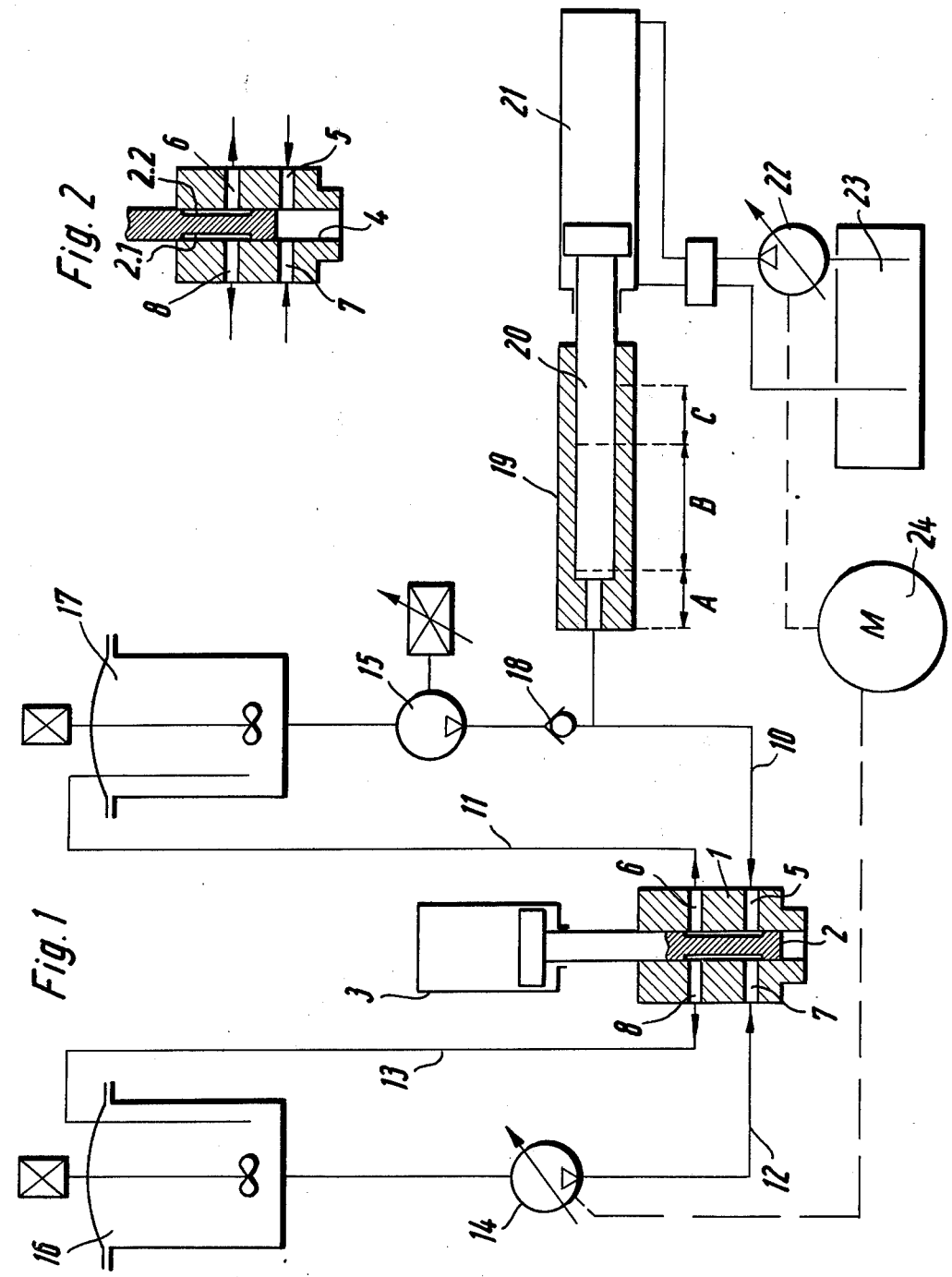

METHOD AND APPARATUS FOR PREPARING MULTI-COMPONENT PLASTIC MATERIALS, PARTICULARLY POLYURETHANE, WITH SOLID MATERIAL ADDITIVES OR AT LEAST ONE HIGHLY VISCOUS COMPONENT

The present invention relates to a method and an apparatus for preparing muti-component plastic materials such as particularly polyurethane in which at least one component includes admixed solid materials or is highly viscous whereby the components are metered separately by continuously operating pumps and the mixing step is effected in a mixing chamber, optionally after incorporating the solid materials.

Various approaches have been suggested for admixing solid materials such as fiber materials, particularly glass fibres, finely divided granulated materials such as talcum and barium sulfate to at least one component in a method and an apparatus of the above stated type. All of these heretofore known methods are being carried out in the low pressure range, i.e. with an agitator in the mixing chamber. Similar methods and apparatus may likewise be employed for highly viscous components, i.e. components having a viscosity in excess of 2000 centipoise. On principle it has heretofore not been known to mix compounded components, i.e. components loaded with solid materials or highly viscous components in high pressure mixing chambers, that is mixing chambers without agitator.

Furthermore there are already known, in principle, apparatus for the mixing of multi-component plastic materials, particularly polyurethanes, in which is employed a pilot piston allowing in its mixing position the components to flow into the mixing chamber and in its closing position allowing the components to flow along return grooves back into their respective reservoirs. So far, mixing apparatus of this type have not been employed for compounded or highly viscous components. In the heretofore known mixing apparatus, these components have been fed and metered by means of continuously operating pumps such as radial flow or axial flow type piston pumps.

Finally it has also become known to employ piston pumps for feeding the components in low pressure mixing operations, i.e. in mixing operations with an agitator in the mixing chamber. The pistons of the piston pumps for all components are thereby operated jointly by hydraulical means whereby the individual components had been mechanically linked.

It is now the object of the present invention to provide a novel and improved method and an apparatus of the type as stated in the beginning of the present specification, in which are taken into account the technical problems involved in the admixing of solid materials or highly viscous components of a viscosity of up to 30,000 centipoise, particularly feed problems, and which permit the generation of high injection pressures at the entry into the mixing chamber.

This object is achieved by the fact that the mixing chamber includes a control piston known per se, the control piston in a mixing position allowing the components to flow into the mixing chamber and in its closing position allowing the components to flow along return grooves back to their respective reservoirs, and that at least for the solid material-containing or highly viscous component piston pump type transmitter means is connected between a continuously operating pump and an inlet of the mixing chamber, the transmitter means adapted to be actuated by a hydraulic piston cylinder assembly operatively connected to the continuously operating pump whereby a first portion of a transmitter pumping stroke is performed while the control piston is in its return position, a second portion of the transmitter pumping stroke is performed while the control piston is in the mixing position, and a third portion of the transmitter pumping stroke is performed while the control piston is again in its return position.

In accordance with the present invention the components are metered (but not fed) by continuously operating pumps, as is conventional, whereby these pumps may consist of axial flow type or radial flow type piston pumps. For the solid materials loaded or highly viscous component a piston pump is connected in line, and the piston of this additional piston pump is operated by the continuously operating pump. The other non-compounded or not highly viscous component is supplied directly by the continuously operating pump. These two pumps may be adjusted in a known manner for a desired range of component ratios at the entry of the mixing chamber. According to the present invention, there is merely provided an in-line transmitter for generating the required high pressures in feeding the compounded component or a highly viscous component. The metering of these components is effected in the conventional manner by a continuously operating pump, in retaining the advantages offered thereby. The transmitter operating as a piston pump is of a design and of corresponding dimensions so that in every mixing operation, i.e. for every shot is performed a complete piston stroke. This pressure stroke for feeding the component into the mixing chamber is followed by a suction stroke by which the transmitter is filled for the next subsequent shot. Since initially a portion of the pressure stroke is performed while the control piston is still in its closing or return flow position, it is ensured that a desired flow is established and the corresponding component loaded with the solid materials or of a high viscosity will be fed into the mixing chamber at the correct mixing ratio when subsequently to the first portion of the pressure stroke the control piston uncovers the entry port of the mixing chamber.

After having mixed a desired quantity of components, the control piston is moved again into its closing position while the pressure stroke of the transmitter is still being continued along a predetermined portion, in order to effectively ensure a sufficient quantity of component being available in the mixing position. During this last portion of the pressure stroke, the components flow back, along return grooves, into their respective reservoirs. The method cycle is continued by the suction stroke for filling the piston pump type transmitter so that the latter is filled or charged for the next following mixing operation.

According to the present invention there is basically provided a transmitter operated by a conventional and continuously operating pump through a separate hydraulic circuit. The continuously operating pump may likewise be called a metering pump. The transmitter effectively overcomes the particular problems due to the admixing of solid materials of a high viscosity. In contrast to heretofore known high pressure mixing apparatus in which are not intended to be mixed extremely difficult-to-handle components of this type, the continuously operating pump for metering the compounded or highly viscous component is served by a special hydraulic circuit by which may be actuated the piston pump type transmitter that is designed with suitable dimensions.

Advantageously, the two continuously operating pumps, i.e. the metering pumps, may be actuated by common drive means. In that case, only one motor is provided for both pumps, and this motor ensures synchronism and an even and reproducible mixture ratio.

The apparatus for carrying out the method of the present invention may include, in addition to the piston pump type transmitter, a filling pump connected between the associated reservoir and the transmitter inlet, the filling pump having a delivery exceeding the delivery of the transmitter during a suction stroke. By this arrangement is ensured that likewise during a suction stroke a quantity of component, even if this is only a reduced quantity, flows back to the reservoir through the associated return groove, in avoiding the separation of components and always ensuring a sufficient quantity of component being available during the suction stroke. The flow, therefore, is never at a standstill.

Advantageously, a check valve may be provided at the inlet of the piston pump type transmitter, in order to prevent component flow toward the filling pump during the pressure stroke. For effectively ensuring a fluid tight seating position, there is preferably employed a positively actuated valve such as a Scheer type closing valve.

By the selection of suitable ratios and dimensions of the piston of the hydraulic cylinder and of the transmitter, the latter may be employed as a pressure converter for generating higher pressures than the pressures delivered by commercial continuously operated pumps that do not exceed about 200 bars (2840 PSI).

Further advantages and more details of the present invention will be described more in detail in the following with reference to the embodiment shown in the appended drawing wherein FIG. 1 is a schematical view of an apparatus for carrying out the method of the present invention; and FIG. 2 is a fragmentary schematical view of the mixing chamber whereby the control piston is in the mixing position.

The apparatus shown in the drawing includes a mixing apparatus 1 with a mixing chamber 4 within which may be oscillated a control piston 2. The control piston 2 includes individual return grooves 2.1 and 2.2 for every component.

In the here illustrated embodiment, there are made provisions for two components, and there are correspondingly provided two return grooves. The mixing chamber 4 includes two inlet ports 5 and 7, one for each component, and two outlet ports 6 and 8, one for each component. In the closing position of the control piston the inlet port 5 is in communication with the outlet port 6 through the one return groove 2.2, and the other inlet port 7 is in communication with the outlet port 8 through the other return groove 2.1 (when the control piston is in the position shown in FIG. 1).

The inlet port 5 is connected with a feed flow conduit 10. The inlet port 7 is connected to a feed flow conduit 12. The outlet port 6 is connected through a return conduit 11 to a reservoir 17, and the outlet port 8 is connected through a return conduit 13 to another reservoir 16.

In the feed flow conduit 12 is connected a continuously operating pump 14.

The component stored in the reservoir 17 is highly viscous or constitutes a carrier for admixed solid materials of various types. An agitator is schematically indicated. An outlet conduit connects this reservoir 17 to a filling pump 15, and this filling pump 15 supplies the component either together with included solid materials or in a highly viscous form through a check valve 18 to a piston pump that operates as a transmitter. The piston 20 of this transmitter may be reciprocated within the corresponding cylinder 19 by a piston cylinder assembly 21. The transmitter actually comprises a pressure converter because the piston 20 is smaller in size than the piston in motor 21, and accordingly, the transmitter may generate pressures higher than those pressures existing in the motor 21. The actuating means for the piston cylinder assembly 21 is a continuously operated pump 22 that corresponds to the pump 14. The pump 22 does not directly feed the component but supplies a hydraulic medium from a hydraulic fluid reservoir 23. The in-line transmitter acts directly onto the component, in order to establish the required pressure. The two pumps 14 and 22 virtually constitute the metering pumps and may be actuated by a common motor 24.

In FIG. 2 the control piston 2 is shown in the mixing position in which the inlet ports 5 and 7 are in communication with the mixing chamber 4 so that the components supplied through the feed flow conduits 10 and 12 may be discharged into the mixing chamber.

Assuming that the transmitter consisting of piston 20 and cylinder 19 is filled with the component of the reservoir 17 and a shot, i.e. a mixing operation is intended to be carried out, the piston 20 moves initially along a stroke portion or path C. During this movement the pump 14 is already energized and supplies the component from the reservoir 16. Since, however, the control piston 2 is still in the closing or return flow position, both components are being returned into their respective reservoirs along the associated return grooves during this movement of the piston 20 along the portion C of the pressure stroke. When the piston 20 has moved through the portion C, the control piston 2 is moved, by its accociated hydraulic cylinder 3, according to a control signal, into the position shown in FIG. 2.

During the whole pressure stroke movement along the path section B, the two components may enter the mixing chamber 4 and are intimately mixed therein, as is conventional. The components may e.g. be discharged into a mold in which the curing reaction of the components takes place. After the piston 20 has moved through the path section C, the control piston 2 is moved back into the position shown in FIG. 1, by a corresponding control signal. As before, during the movement along the path portion C, the components are now again returned back into their respective reservoirs via the associated return grooves.

Upon termination of its movement, the piston 20 commences with a suction stroke for filling the transmitter. The filling pump 15 thereby delivers the component compounded with solid material or a highly viscous component into the cylinder of the transmitter via the check valve 18. The delivery of the filling pump 15 exceeds the delivery of a suction stroke of the transmitter so that the excess component flows through the flow conduit 10, the inlet port 5, the corresponding return groove, the outlet port 6 and the return conduit 11 back into the reservoir 17. By this flow a separation of the component is avoided.

In principle, both components may be supplied in the same manner as the components supplied from the reservoir 17. In the latter case, a corresponding transmitterr would of course be provided likewise for the other component.

What is claimed is:

1. A method of preparing multi-component plastic materials such as particularly polyurethane, in which at least one component includes admixed solid materials or is highly viscous whereby the components are metered separately by continuously operating pumps and the mixing step is effected in a mixing chamber, optionally after incorporating the solid materials, said method characterized in that the mixing chamber includes a control piston known per se, the control piston in a mixing position allowing the components to flow into the mixing chamber, and in its closing position allowing the components to flow along return grooves back to their respective reservoirs, and that at least for the solid material-containing or highly viscous component piston pump type transmitter means is connected between a continuously operating pump and an inlet of the mixing chamber, said transmitter means adapted to be actuated by a hydraulic piston cylinder assembly operatively connected to said continuously operating pump whereby a first portion (C) of a transmitter pumping stroke is performed while the control piston is in its return position, a second portion (B) of the transmitter pumping stroke is performed while the control piston is in the mixing position, and a third portion of the transmitter pumping stroke is performed while the control piston is again in its return position.

2. A method according to claim 1, characterized in that the two continuously operating pumps serving as metering pumps are actuated by common drive means.

3. An apparatus for carrying out the method of claim 1 or 2, said apparatus characterized in that in addition to said piston pump type transmitter means a filling pump is connected between the associated reservoir and the transmitter inlet, said filling pump having a delivery exceeding the delivery of said transmitter during a suction stroke.

4. An apparatus according to claim 3, characterized in that a check valve is provided at the inlet of said piston pump type transmitter.

5. An apparatus according to claim 3, characterized in that said check valve is a positively actuated valve.

6. An apparatus according to claim 3, characterized in that said hydraulic piston cylinder assembly and said transmitter means consist of pressure converter devices.

* * * * *